Feb. 22, 1927.
M. J. RITT
ENGINE MOUNTING MEANS
Filed April 22, 1926
1,618,354
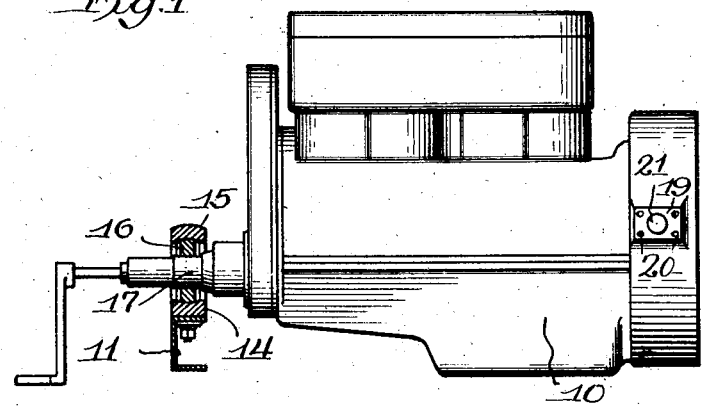
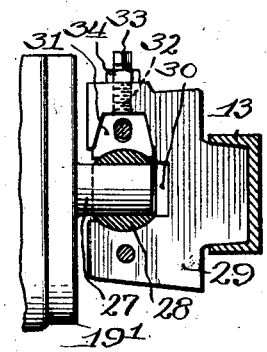
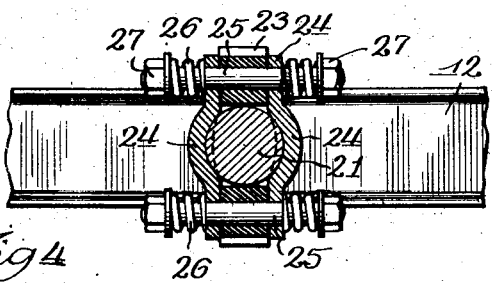
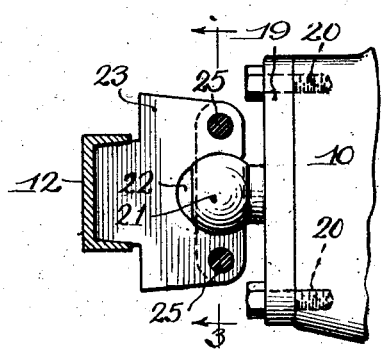
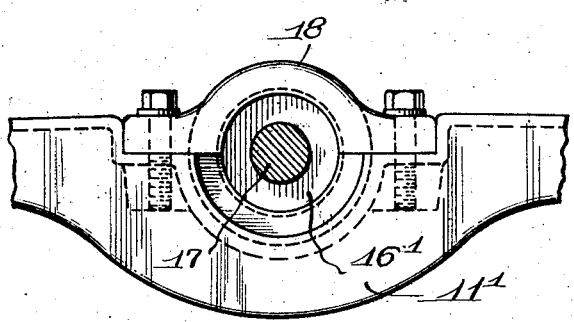
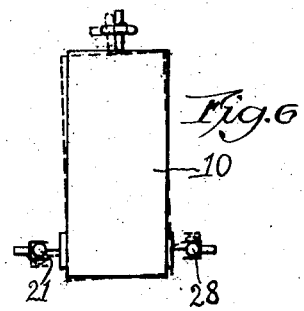
Inventor,
Michael J. Ritt.

Patented Feb. 22, 1927.

1,618,354

UNITED STATES PATENT OFFICE.

MICHAEL J. RITT, OF CHICAGO, ILLINOIS.

ENGINE MOUNTING MEANS.

Application filed April 22, 1926. Serial No. 103,690.

My invention relates to improvements to engine mounting means.

The principal object of the invention is to provide mounting means which will permit a relative movement of the engine with reference to the chassis frame when the vehicle is subjected to shocks due to collisions or other extraordinary stresses, and cushion such movement of the engine to avoid damage thereto.

Another object is to provide adjustment means for preventing said mounting means from rattling after a period of use.

Other objects relate to various features of construction and arrangement of parts which will become apparent from a consideration of the following specification and accompanying drawings, wherein—

Figure 1 is a side elevation of an engine of a motor vehicle showing the forward mounting means in section.

Fig. 2 is an enlarged vertical section showing a modified form of cross-frame member.

Fig. 3 is a broken vertical sectional view showing one of the two side or lateral mounting members.

Fig. 4 is a vertical section taken on line 3—3, Fig. 3.

Fig. 5 is a view similar to Fig. 3, but showing the opposite mounting member with certain parts omitted for the purpose of clearness.

Fig. 6 is a diagrammatic view illustrating in dotted lines lateral displacement of the engine.

In the drawings, 10 is an automobile engine which is adapted to be attached to the front transverse frame member 11 and to the side frame members 12 and 13.

In Fig. 1, the front frame member 11 is shown as supporting lower and upper socket members 14 and 15, respectively, secured to member 11 by bolts or the like, said members together forming a socket having a wall shaped as a portion of a sphere whereby the similarly shaped peripheral surface of the bearing member 16 can be universally moved therein, similar to a ball and socket joint. Member 16 is centrally apertured, and through said aperture extends the cylindrical extension 17 of the engine casing. The projection 17 is slidable in the aperture, whereby the engine is permitted to move slightly in a longitudinal direction when the vehicle is subjected to shocks at either end.

In Fig. 2, the transverse frame member 11' is shown as being provided with a semicircular recess, over which is secured the plate 18 also provided with complementary semi-circular recesses. Plate 18 is removably secured to the transverse frame member 11' by means of cap screws 19.

The wall of the opening formed by the registering recesses in member 11' and plate 18 is formed as a portion of a sphere, the curvature of the wall being similar to that shown in Fig. 1. Within the opening is positioned a plate or bearing member 16', the peripheral surface of which is shaped to conform with the curvature of the wall of the previously mentioned opening, whereby said bearing member 16' can be moved angularly with respect to the frame member 11'. This construction provides, in effect, a ball and socket joint, similar to the construction shown in Fig. 1.

The bearing member 16' is centrally apertured through which aperture extends the cylindrical portion 17 of the engine 10. The extension or portion 17 is of somewhat greater length than the thickness of the bearing member 16'. By the construction described, provision is made for a sliding movement of the engine in a direction parallel to the side frame members 12, 13, as well as angular movements which may be imparted to the engine by abnormal stresses due to collisions or the like.

On the opposite sides of the engine casing, near the rear end thereof, are secured plates 19, 19', by means of screws 20, the plate 19 being provided with a laterally extending ball 21, which is positioned in a recess 22 in a bracket 23 which is secured to the adjacent side frame member 12 by any approved means. The wall of the aperture 22 is at right angles to the vertical surface of the bracket, whereby the ball 21 can be readily positioned therein. Disposed on each side of the bracket 23 is a plate 24 having a cavity in its central portion, as illustrated in Fig. 4. These complementary depressions or cavities of the plates 24, as will be seen, coact with the aperture 22 of bracket 23 to form a socket for the ball 21. Pins 25 pass freely through suitable openings in the ends of the embracing plates 24 and bracket 23 on each side of the recess 22 and carry springs 26 compressed between the nuts 27 and the adjacent ends of the said plates to hold the latter normally in the position shown in Fig. 4. It will be seen that this construction provides a resilient ball and socket joint, whereby the engine 10 is permitted to move longitudinally of the vehicle frame under abnormal stresses, such movement being cushioned by the springs 26. It will be understood, of course, that the relative arrangement of the ball and socket may be reversed, i. e., the ball may be supported by the side frame member 12, while the bracket 21 and socket forming members 22 may be secured to the engine.

The plate 19' on the opposite side of the engine is provided with a stud 27 on which is slidably positioned a ball collar 28. The collar forms, in effect, a ball which is retained in the aperture of the bracket 29 which is secured to the side frame member 13. The aperture in the bracket 29 is formed, as at 30, to provide space into which the inner end of stud 27 can move when either frame member 12 or 13 is sprung inwardly, as will be seen, as when the vehicle is run into by another car. The section 31 of the bracket 29 bearing on the upper portion of the ball 28 may be formed separately, as shown, and is adjustable by screw 32 to take up wear and prevent rattling. The screw 32 may have a squared or hexagonal head 33 for engagement by a wrench or the like and is also provided with a lock nut 34. It will be understood that a pair of socket forming plates, similar to plates 24, 24, previously described, will be provided for coaction with the ball 28 and bracket 29, as on the opposite mounting member.

The bracket 23 may have an adjustable section, similar to section 31 of bracket 29 for taking up wear, if desired, or both brackets may be of the one piece construction, shown in Fig. 3. It will be apparent that if the vehicle is struck with sufficient force to spring the side frame member 12 near the front thereof, such motion will be transmitted to the engine and to the stud 27 on the opposite side, which will move into the clearance space 30 thereby avoiding the injury to the engine casing which is now frequently caused where no provision is made for such movement of the engine relatively to one side frame member. Should the frame 13 be sprung inwardly, such thrust will not be transmitted directly to the engine due to the floating connection between the said frame 13 and the engine, except in extreme cases.

By having the ball 21 secured against lateral movement with reference to the frame member 12, the engine is suitably anchored against moving transversely of the frame under normal conditions. The brackets 23 and 29 prevent any vertical movement of the engine with reference to the frame, while the springs 26 on each of the rear mounting means and the universal joint at the front permit an angular movement of the engine when one or both of the side frame members are sprung. The springs 26, together with the sliding fit of the extension 17 in the bearing member 16, 16' permit of the longitudinal movement of the engine relatively to the frame when the vehicle is struck at either end. In all these movements, the spring structure of the rear mounting means cushions the shocks which in the rigid mountings at present commonly employed, cause serious damage to the engine.

Although I have shown certain features of my improvements for the purpose of illustration, it will be apparent that various changes may be made therein without departing from the spirit of the invention, and I do not wish to be restricted therefore to the specific form herein shown and described except where limitations thereto appear in the appended claims.

What I claim is:

1. In combination, a vehicle frame, an engine, and means for flexibly securing said engine to said frame, said means comprising a member having a sliding and universal engagement with a forward portion of said engine, and ball and socket connections at the rear side portions of said engine adapted to permit of longitudinal movement of the engines with reference to said frame.

2. In combination, a vehicle frame, an engine, means for flexibly securing said engine to said frame, said means comprising a member having a sliding and universal engagement with a forward portion of said engine, and ball and socket connections at the rear side portions of said engine, said socket connections each comprising a pair of spring resisted complementary socket forming members adapted to permit of longitudinal movement of the engines with reference to said frame.

3. In combination, a vehicle frame, an engine, means for flexibly securing said engine to said frame, said means comprising a member having a sliding and universal engagement with a forward portion of said engine, and ball and socket connections at the rear side portions of said engine, said socket connections each comprising a pair of spring resisted complementary socket forming members adapted to co-operate with said sliding universal connection at the front of said engine for permitting lateral and longitudinal movement of said engine relatively to said frame.

4. In combination, a vehicle frame having side frame members and a transverse member having a circular opening therein, an apertured bearing member in said opening and having a ball and socket engagement therewith, said engine having a forwardly extending portion slidably positioned in the aperture of said bearing member, and flexible mounting means at the rear portion of said engine for securing the engine to the side frame members.

5. In combination, a vehicle frame having side frame members and a transverse frame member having a circular opening therein, an apertured bearing member in said opening, the wall of said opening and the peripheral surface of said bearing member each being formed as a portion of a sphere whereby said bearing member is universally movable with reference to said transverse member, said engine having a forwardly extending cylindrical portion slidably positioned in the aperture of said bearing member, and mounting means adjacent the rear of said engine on each side thereof for flexibly securing the same to said side frame members.

6. In combination, a vehicle frame having side frame members, a transverse frame member having a circular opening therein, an apertured bearing member in said opening, the wall of said opening and the peripheral surface of said bearing member each being formed as a portion of a sphere whereby said bearing member is universally movable with reference to said transverse member, said engine having a forwardly extending cylindrical portion slidably positioned in the aperture of said bearing member, mounting means adjacent the rear of said engine on each side thereof for flexibly securing the same to said side frame members, each of said mounting means comprising a recessed bracket secured to one of said frame members, a ball secured to said engine and extending into said recess, and a pair of spring resisted socket forming plates secured to said bracket and embracing said ball, one on each side of said bracket.

7. Means for securing an engine to the frame of a vehicle comprising a ball secured to the engine, a recessed bracket secured to the frame, said ball being positioned in said recess, a pair of plates each having a socket forming depression therein adapted to embrace said ball, one on each side of said bracket, a pair of pins extending through said plates and bracket, and springs on said pins tending to urge said plates against said ball and bracket, but permitting relative movement of said ball relatively to said bracket when said engine is subjected to abnormal shocks.

In testimony whereof, I have subscribed my name.

MICHAEL J. RITT.